UNITED STATES PATENT OFFICE.

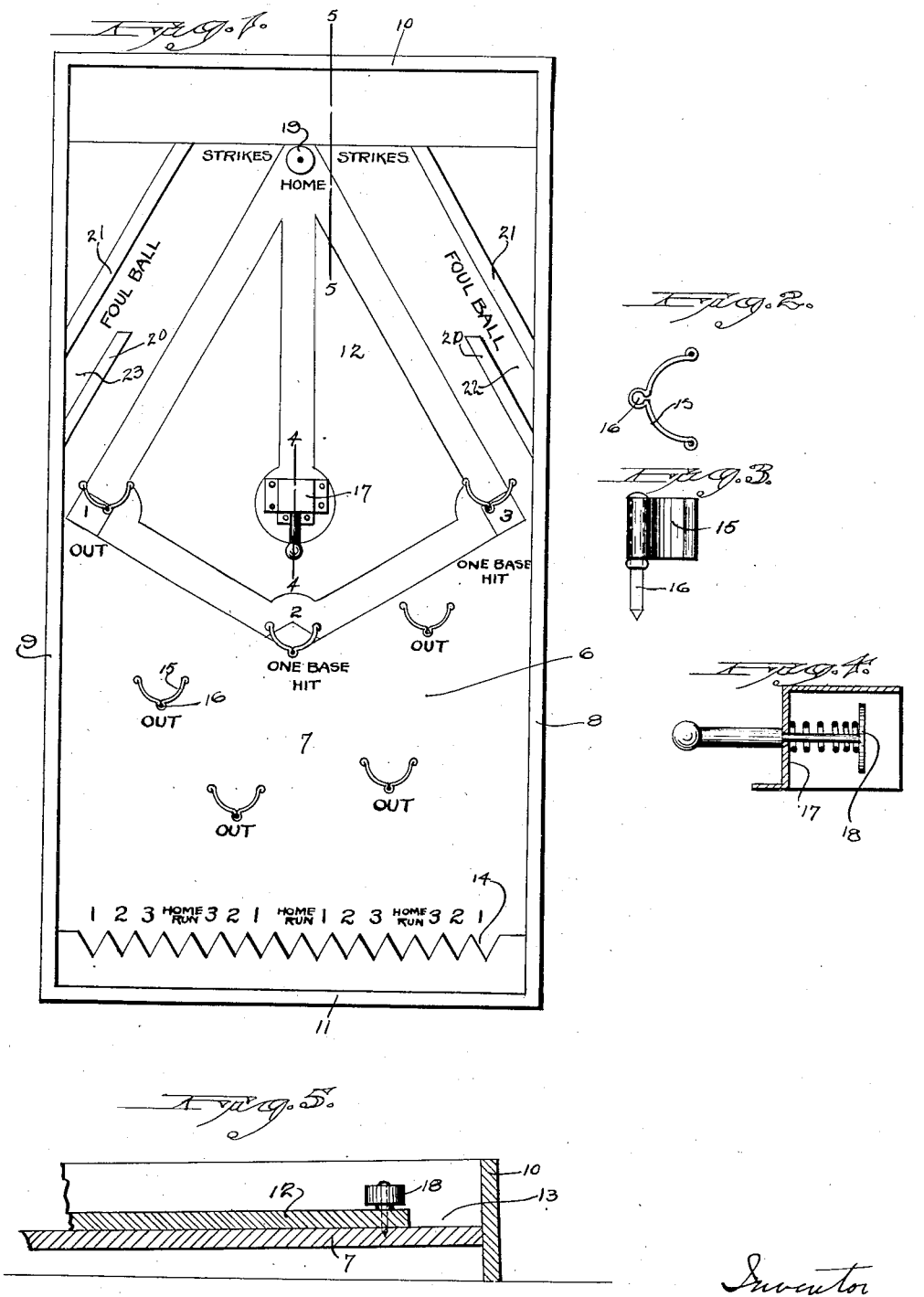

HERMAN KAUFMAN, OF NEW HAVEN, CONNECTICUT.

GAME.

1,381,563.  Specification of Letters Patent.  Patented June 14, 1921.

Application filed March 22, 1920. Serial No. 367,614.

*To all whom it may concern:*

Be it known that I, HERMAN KAUFMAN, a citizen of the United States, residing at New Haven, in the county of New Haven and State of Connecticut, have invented a new and useful Improvement in Games; and I do hereby declare the following, when taken in connection with the accompanying drawings and the characters of reference marked thereon, to be a full, clear, and exact description of the same, and which said drawings constitute part of this application, and represent, in—

Figure 1 a plan view of a game apparatus constructed in accordance with my invention.

Fig. 2. a plan view of one of the cages detached.

Fig. 3. a side view of the same.

Fig. 4. a sectional view on the line 4—4 of Fig. 1.

Fig. 5. a sectional view on the line 5—5 of Fig. 1.

This invention relates to an improvement in games and particularly to apparatus for playing a form of base-ball, the object of the invention being to produce a device in which the several plays of baseball may be simulated; and the invention consists in the construction as hereinafter described and particularly recited in the claim.

In carrying out my invention, I employ a box 6 of suitable size, having a bottom 7, sides 8 and 9, and ends 10 and 11, the end 10 projecting below the bottom so that the box stands in an inclined position when placed upon a table. Resting upon the bottom is a field 12 which is shorter than the bottom so as to leave a space 13 between the upper end of the field and the end 10 of the box. The inner face of the end 11 is formed with a series of notches 14.

The field is laid out like a baseball field and at the points representing the bases and the fielders, are cages 15, each formed from a strip of sheet-metal bent into semi-circular form and mounted upon a pin 16 so as to freely turn thereon. Mounted on the field at the pitcher's box, is a housing 17 in which is mounted a spring plunger 18, and at home-plate is mounted a disk 19 free to rotate on its pin. At each side of the field near the upper end, are two pairs of reversely inclined fences 20 and 21 forming pockets 22 and 23 between them. The various notches 14 are marked to indicate plays.

A small ball or marble is placed in the housing 17 and the plunger operated to project the ball. If the ball hits home-plate, it will rebound therefrom and return down the field. If it is caught by either of the cages and held, the player is out, but if the ball strikes one side of one of the cages, it will turn that cage and escape, and if not caught by one of the other cages, will pass on into one of the notches in the end 11, and the position indicated by the notch will be taken by one of a series of men in the form of disks of contrasting colors to indicate the different teams. If the ball rolls off the field into the space 13, it counts as a strike. If the ball rolls into one of the pockets 22 or 23, it counts as a foul ball; and when one side has three men out, the other side plays, and the score is kept in the same way as in regular baseball.

I claim:

A game apparatus comprising a field formed at its upper end with a space extending transversely across the field, the bottom of the space being below the surface of the field, a horizontally arranged rotatably mounted disk in the center of the field adjacent to the edge of the said depressed space, a pocket on each side of the field, a series of cages independently and loosely pivotally mounted on pins arranged upon the field and means for impelling a ball.

In testimony whereof, I have signed this specification in the presence of two subscribing witnesses.

HERMAN KAUFMAN.

Witnesses:
ALBERT QUINTO,
W. BENNY SIEGALL.